(12) United States Patent
Okada et al.

(10) Patent No.: US 8,179,641 B2
(45) Date of Patent: May 15, 2012

(54) DISK DRIVE APPARATUS AND HEAD ASSEMBLY USING A RESIN MEMBER TO ACCOMMODATE A WIRE STRUCTURE

(75) Inventors: Takahisa Okada, Kanagawa (JP); Kohji Takahashi, Kanagawa (JP); Takeshi Saito, Kanagawa (JP); Tomoki Hiramatsu, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1082 days.

(21) Appl. No.: 11/784,374

(22) Filed: Apr. 6, 2007

(65) Prior Publication Data
US 2007/0242390 A1 Oct. 18, 2007

(30) Foreign Application Priority Data

Apr. 17, 2006 (JP) ................................ 2006-113267

(51) Int. Cl.
*G11B 5/55* (2006.01)
(52) U.S. Cl. .................................................. 360/265.7
(58) Field of Classification Search ............... 360/266.3, 360/265.9, 264.2, 265.7, 266.5, 245.8, 266.1, 360/266; 29/603.07
See application file for complete search history.

(56) References Cited

U.S. PATENT DOCUMENTS

| 4,391,035 | A | * | 7/1983 | Van de Bult | 29/603.06 |
| 5,731,930 | A | * | 3/1998 | Maggio et al. | 360/264.2 |
| 5,999,372 | A | * | 12/1999 | Peterson et al. | 360/265.9 |
| 6,108,174 | A | * | 8/2000 | Adams | 360/266.1 |
| 6,493,186 | B1 | * | 12/2002 | Segar et al. | 360/244.5 |
| 6,614,626 | B2 | * | 9/2003 | Raphael et al. | 360/266 |
| 6,867,950 | B1 | * | 3/2005 | Lin | 360/265.8 |
| 2004/0240118 | A1 | * | 12/2004 | Hayakawa et al. | 360/264.2 |
| 2005/0152071 | A1 | * | 7/2005 | Hayakawa et al. | 360/266.3 |
| 2005/0157425 | A1 | * | 7/2005 | Walter et al. | 360/234.6 |

FOREIGN PATENT DOCUMENTS

| JP | 2001-344918 | 12/2001 |
| JP | 2004-355721 | 12/2004 |

* cited by examiner

*Primary Examiner* — Allen Cao

(57) ABSTRACT

Embodiments in accordance with the present invention allow a resin member accommodating therein a trace, to have a small thickness. An HDD according to an embodiment of the present invention includes a resin accommodation member fixed to a side surface of arms. Part of a trace is accommodated in a slit formed in the accommodation member. Accommodating part of the trace in the slit helps suppress fluttering of the trace and improve head positioning accuracy. A corrugated surface structure is formed on each of surfaces of the arms and the accommodation member in abutment with each other. The corrugated surface structure is used to position the accommodation member in a pivot direction. The accommodation member, having the corrugated surface structure for positioning on the surface being fixed, can be made to have a thin wall.

3 Claims, 8 Drawing Sheets

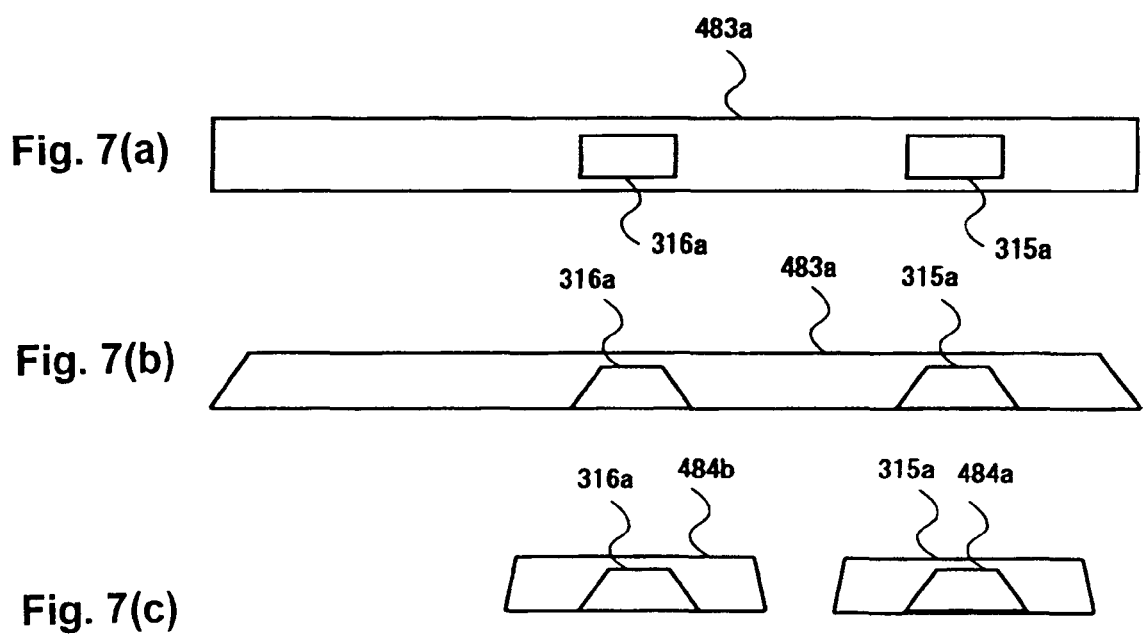

DISK DRIVE APPARATUS AND HEAD ASSEMBLY USING A RESIN MEMBER TO ACCOMMODATE A WIRE STRUCTURE

CROSS-REFERENCE TO RELATED APPLICATION

The instant nonprovisional patent application claims priority to Japanese Patent Application No. 2006-113267, filed Apr. 17, 2006 and incorporated by reference in its entirety herein for all purposes.

BACKGROUND OF THE INVENTION

Devices using various types of media such as optical discs, magnetic optical discs, and flexible magnetic disk are known in the art of data storage devices. Among them, hard disk drives (hereinafter referred to as HDDs) have become popular as storage devices for computers to such an extent that they are one of the storage devices indispensable for today's computer systems. Further, not limited to the computers as described above, HDDs are becoming more and more widely used in various applications. For example, HDDs are used for video recording/reproducing devices, car navigation systems, cellular phones, and as removable memories for use in digital cameras.

A HDD includes a magnetic disk, a head slider, and an actuator. Data is stored on the magnetic disk. The head slider reads data from, and/or writes data to, the magnetic disk. The actuator moves the head slider to a desired position over the magnetic disk. The actuator is driven by a voice coil motor, pivotally moving about a pivot. As a result, the actuator moves the head slider radially above a spinning magnetic disk.

The head slider moves to a desired track formed on the magnetic disk, reading or writing data. The head slider includes a slider, on which a head element portion is disposed. The head element portion includes a write element and/or a read element. The write element converts an electric signal to a corresponding magnetic field according to the data to be recorded onto the magnetic disk. The read element, on the other hand, converts a magnetic field from the magnetic disk to a corresponding electric signal.

The actuator includes an elastic suspension. The head slider is fixed to the suspension. The head slider can fly at a predetermined gap above the magnetic disk by the following action. Specifically, pressure generated by viscosity of air between an ABS (air bearing surface) of the slider opposing the magnetic disk and the spinning magnetic disk balances pressure applied in the direction of the magnetic disk by the suspension. The suspension includes a gimbal and a load beam. The gimbal holds the head on the side of a surface opposing the magnetic disk. The load beam holds the gimbal on the side of the surface opposing the magnetic disk. The gimbal is formed to be deformable such that the slider can incline in a predetermined direction to offset runout of the magnetic disk.

The actuator also includes a wire structural portion for transmitting head signals. In this specification, the wire structural portion is called a "trace." The trace transmits signals between a preamp IC disposed near the pivot of the actuator and the head slider. The trace has a proximal end connected to the head slider. The preamp IC is mounted on an FPC, to which a distal end of the trace is connected through soldering or other method.

A trace, not fixed to the actuator, can oscillate, thus affecting head positioning. For example, Japanese Laid-Open Patent No. 2004-355721 ("Patent Document 1"), discloses an arrangement, in which the trace is accommodated in a slit surrounded by two protruding walls, thereby suppressing vibration of the slider caused by an air flow generated through spinning of the disk. The arrangement includes a wire support member mounted with an adhesive to an outer side surface of an actuator arm. The wire support member includes a slit that extends in a longitudinal direction, in which the trace is accommodated.

Use of the member for accommodating the trace as described above helps suppress fluttering phenomenon of the trace caused by the air flow generated from spinning of the magnetic disk. It is to be noted herein that, when the trace accommodating member is to be fixed to the outer side surface of the actuator arm using the adhesive, it is necessary that the adhesive be hardened in a condition, in which the trace accommodating member is positioned on the surface after the adhesive has been applied.

The wire support member should preferably be formed of a resin from the standpoints of prevention of damage to the trace and ease of manufacture of the wire support member. A resin molded wire support member is, however, easily deformed in the pivot direction. It is therefore particularly important to fix the wire trace member temporarily before hardening. To position the wire support member in the pivotal movement direction, the wire support member may, for example, be arranged to include a structure that clamps an upper and lower surface of the actuator arm. The wire support member is thereby positioned in the pivot direction.

Such a structure, however, contributes to an increased dimension (thickness) in a vertical direction (pivot direction) of the actuator. Design of the HDD calls for mounting of various components in an enclosure having predetermined dimensions. This requires that the actuator arm be made to be thin enough to accommodate a greater number of magnetic disks, in particular. This is particularly conspicuous in HDDs of 2.5 inches or less having a thin enclosure.

BRIEF SUMMARY OF THE INVENTION

Embodiments in accordance with the present invention allow a resin member accommodating therein a trace to have a small thickness. According to the particular embodiment disclosed in FIG. 1, a HDD includes a resin accommodation member 31 fixed to a side surface of arms 148a to 148c. Part of a trace is accommodated in a slit formed in the accommodation member. Accommodating part of the trace in the slit helps suppress fluttering of the trace and improve head positioning accuracy. A corrugated surface structure is formed on each of surfaces of the arms 148a to 148c and the accommodation member 31 in abutment with each other. The corrugated surface structure is used to position the accommodation member 31 in a pivot direction. The accommodation member 31, having the corrugated surface structure for positioning on the surface being fixed, can be made to have a thin wall.

BRIEF DESCRIPTION OF THE DRAWINGS

FIGS. 7(a) to 7(c) are views showing schematically a condition, in which a protrusion 315a of the accommodation member fits in a recess in a side surface of an arm according to an embodiment of the present invention.

DETAILED DESCRIPTION OF THE INVENTION

Figure 1:
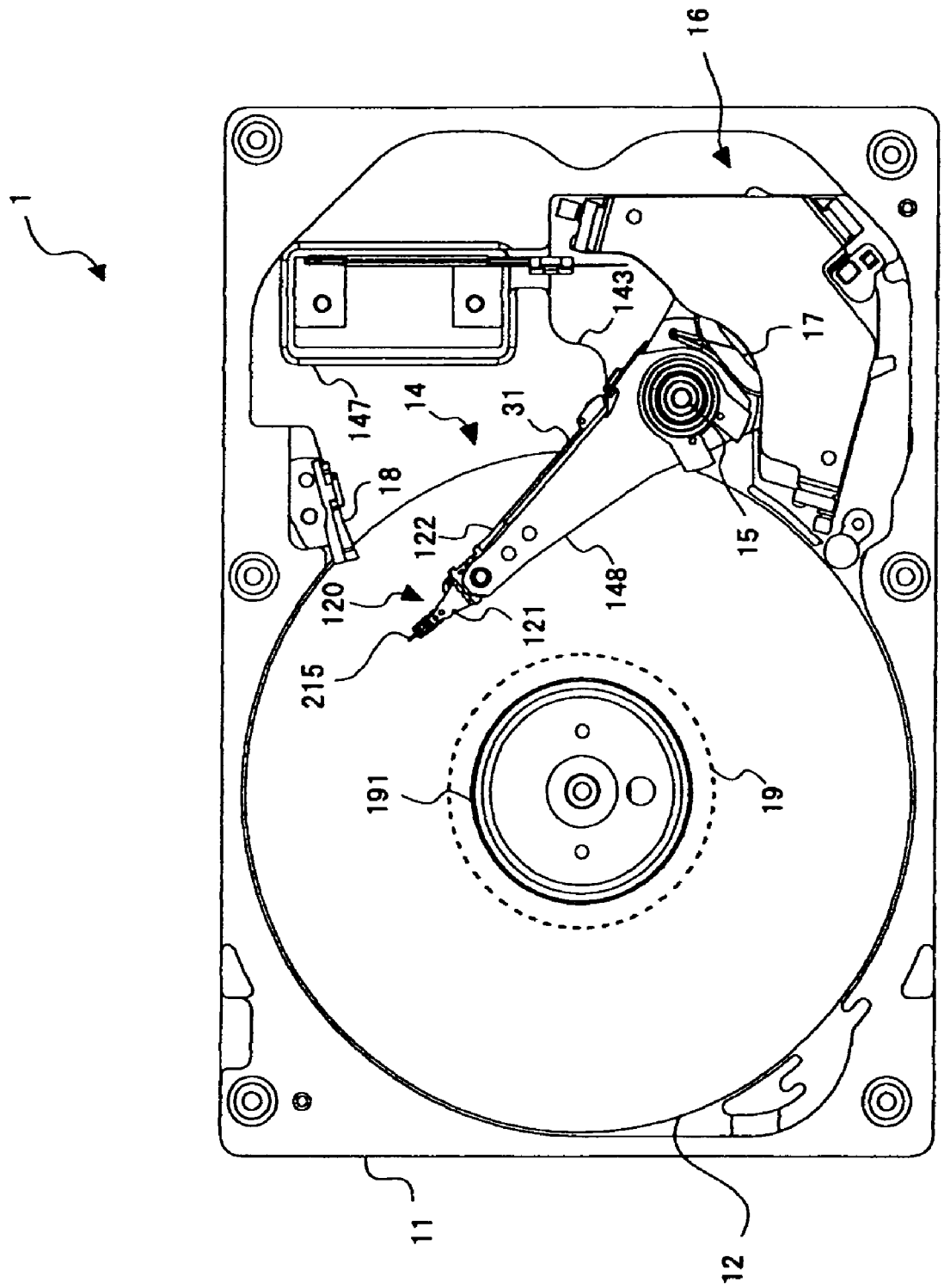
FIG. 1 is a plan view showing schematically an arrangement of a hard disk drive according to an embodiment of the present invention.

Embodiments in accordance with the present invention relate generally to disk drive apparatuses and head assemblies used therefor and, more particularly, to fixing of a resin member accommodating a wire structural portion to an actuator.

A disk drive apparatus according to an embodiment of the present invention includes an enclosure, a head, an actuator, and a resin member. Specifically, the head accesses a disk. The actuator is mounted inside the enclosure, supports the head and pivotally moves about a pivot. The resin member is fixed to a side surface of the actuator. The side surface faces a pivotal motion direction. The resin member has a recess, through which a wire structural portion transmitting signals from the head is passed, formed on a side opposite to the side surface and a corrugated surface structure positioning correctly the resin member in a pivot direction by being fitted into a corrugated surface structure formed on the side surface. The resin member can suppress vibration of the wire structural portion. Further, the corrugated surface structure included in the resin member, which fits into the corrugated surface structure formed on the side surface of the actuator, helps make the resin member thinner.

The resin member may include a protrusion protruding toward the side surface and the side surface of the actuator includes a recess, in which the protrusion of the resin member fits and which has inner walls facing the pivot direction on both sides thereof. These arrangements allow positioning to be made in a pivotal motion direction regardless of whether the resin member is deformed or not, and also facilitates machining.

The resin member may include a plurality of protrusions protruding toward the side surface. The plurality of protrusions may be disposed away from each other in a direction from the pivot toward the head. Each of the plurality of protrusions may fit into a recess formed on the side surface of the actuator and having inner walls facing the pivot direction on both sides thereof. The plurality of protrusions enables effective positioning of the resin member. The plurality of protrusions may fit into one slit-like recess formed on the side surface of the actuator. This produces a number of spaces between protrusions, by which an adhesive can be prevented from being squeezed out.

The resin member may include a plurality of protrusions protruding toward the side surface. The plurality of protrusions can be disposed away from each other in a direction from the pivot toward the head. Further, the plurality of protrusions can fit into one recess formed on the side surface of the actuator. Alternatively, the recess in the side surface of the actuator, in which the protrusion of the resin member fits, can extend beyond both ends of the protrusion of the resin member in a direction from the pivot toward the head. This produces spaces on both sides of the protrusion, by which the adhesive can be prevented from being squeezed out.

The protrusion may have an end on a side of the head disposed on the side of the head relative to a center of the resin member extending in a direction from the pivot toward the head. This effectively corrects warp in the resin member on the side of the head. Alternatively, a gap may exist between a protruding end of the protrusion and a bottom surface of the recess, in which the protrusion fits. This prevents the adhesive from being squeezed out.

The protrusion of the resin member may have a taper on a leading end portion thereof, the taper having a dimension diminishing in the pivot direction toward a leading end thereof. This allows the protrusion to be inserted in the recess in manufacturing processes. Alternatively, the protrusion of the resin member may include recesses formed on both ends thereof in a direction from the pivot toward the head. This prevents the adhesive from being squeezed out.

A gap between a bottom surface on an inside of the enclosure and the resin member may be greater than a gap between the side surface of the actuator and the bottom surface. A gap between a ceiling surface on the inside of the enclosure and the resin member may be greater than a gap between the side surface of the actuator and the ceiling surface. This allows elements within the enclosure to be designed without regard to the thickness of the resin member.

A head assembly according to another embodiment of the present invention includes a head, a suspension portion, an arm portion, a wire structural portion, and a resin member. Specifically, the head accesses a disk. The suspension portion supports the head. The arm portion has a pivot bearing hole formed therein and supports the suspension portion on a side opposite to the head. The wire structural portion is connected to the head and transmits signals from the head. The resin member is fixed to a side surface of the arm portion. The side surface faces a pivotal motion direction. The resin member has a recess, through which the wire structural portion is passed, formed on a side opposite to the side surface. A corrugated surface structure is configured to correctly position the resin member in a pivot direction by being fitted into a corrugated surface structure formed on the side surface of the arm portion.

The resin member may include a protrusion protruding toward the side surface of the arm portion. The side surface of the arm portion may include a recess, in which the protrusion of the resin member fits and which has inner walls facing the pivot direction on both sides thereof. The recess in the side surface of the arm portion may have a length greater than a length of the protrusion of the resin member in a direction along the pivot bearing hole and the head.

According to the embodiments of the present invention, vibration of the wire structure for transmitting signals from the head can be suppressed and the thickness of the wire structure can be made small by passing the wire structure through the recess in the member fixed to the side surface of the actuator.

A specific embodiment to which the present invention is applied will be described below. For the sake of clarity, specific details may be omitted or simplified as appropriate in the descriptions and drawings given hereunder. In each of the accompanying drawings, like reference numerals refer to like parts and duplicate descriptions are omitted as may be applicable for clarity purposes. The embodiments represent a hard disk drive (HDD) and disk drive apparatus.

A HDD according to embodiments of the present invention includes a resin accommodation member fixed to a side surface of an actuator. Part of a trace is accommodated in a slit formed in the accommodation member. Accommodating part of the trace in the slit helps suppress fluttering of the trace and enhance head positioning accuracy. In addition, the actuator and the accommodation member have surfaces, which abut on each other, formed with a corrugated surface structure. The corrugated surface structure ensures that the accommodation member is positioned correctly in a pivot direction. Having the corrugated surface structure for positioning on the surface fixed, the accommodation member can be made to have a thin wall.

A general construction of the HDD will be described. FIG. 1 is a plan view showing schematically a general construction of an HDD 1. The HDD 1 includes one or a plurality of magnetic disks 12 stacked one on top of another, the disks 12 being housed in a base 11 that forms part of an enclosure of the HDD 1. A spindle motor (SPM) 19 spins the magnetic disk 12 as an example of a recording disk. The magnetic disk 12 is fixed to the SPM 19 by a top clamp 191. The base 11 has an opening that is covered with a top cover (not shown). Data can be recorded on one or both surfaces of the magnetic disk 12.

A head slider (see FIG. 2) that accesses the magnetic disk 12 is held at a position near a leading end of an actuator 14. The actuator 14 is held pivotally movably on a pivot 15. The actuator 14 pivotally moves in a direction of being closer to or away from the magnetic disk 12 in order for the head slider to access the magnetic disk 12. The actuator 14 includes an arm 148 and a head gimbal assembly (HGA) 120 connected to the arm 148 on a side opposite to the pivot 15.

Figure 2:
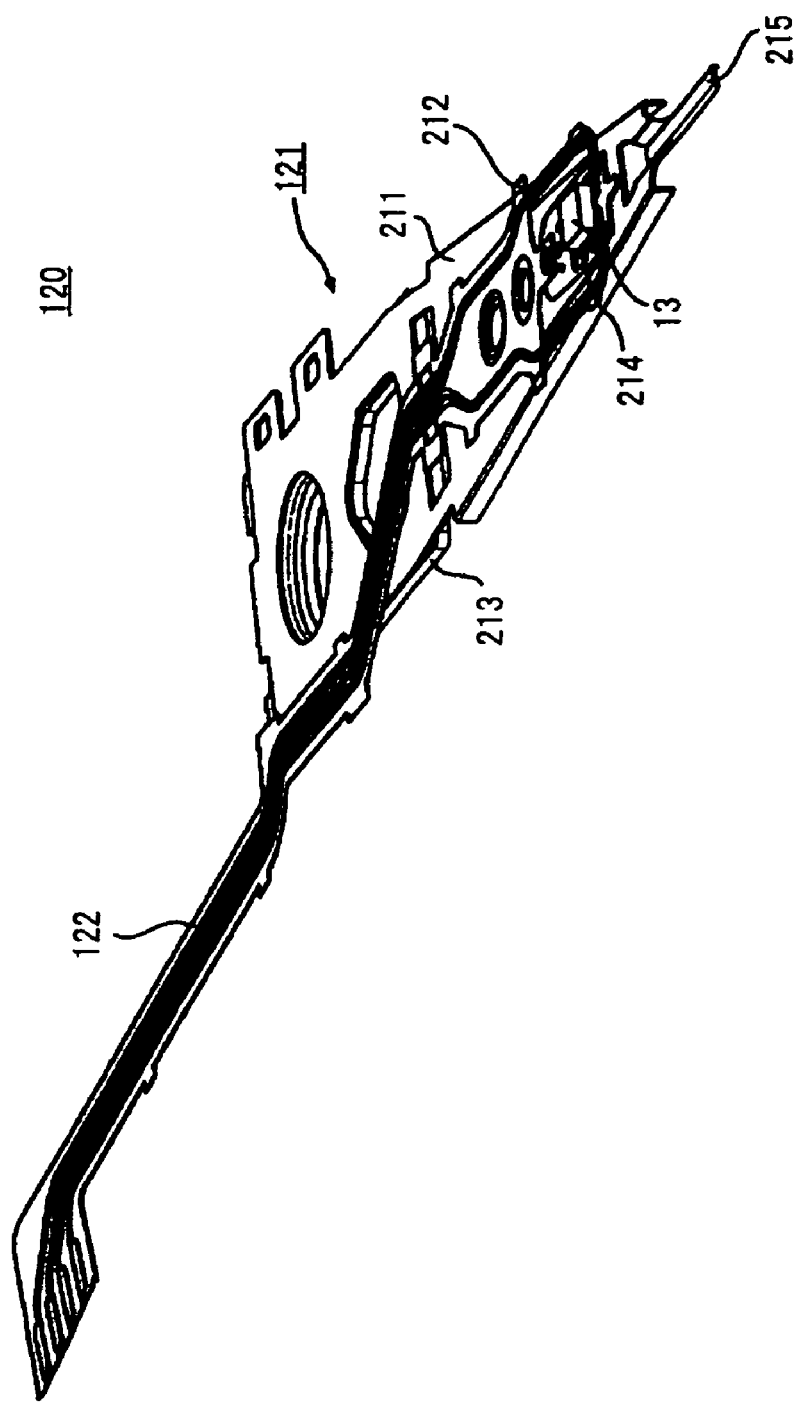
FIG. 2 is a perspective view showing schematically an arrangement of a head gimbal assembly according to an embodiment of the present invention.

Referring to FIG. 2, the HGA 120 includes a head slider 13 and a suspension 121. The suspension 121 having spring performance, holds the head slider 13. The HGA 120 further typically includes a trace 122 as a wire structural portion. In the head slider 13, a read element and a write element function as a transducer that converts a change in a magnetic field to a corresponding electric signal, or vice versa. Each of the read and write elements has two connection pins, each being connected to a corresponding wire of four wires included in the trace 122.

The suspension 121 includes a gimbal 212, a load beam 211, and a mount plate 213. The gimbal 212 has flexibility and holds the head slider 13 on a side opposing the magnetic disk 12. The load beam 211 holds the gimbal 212 on the side opposing the magnetic disk 12. These members are formed of a metal, such as aluminum or stainless steel. The members are joined together into an integrated body through laser spot welding or caulking. The gimbal 212 has a tongue 214. The head slider 13 is fixed to a surface of the tongue 214 with epoxy resin or the like. The gimbal 212 is deformably formed to allow the head slider 13 to be inclined in a predetermined direction, so that runout of the magnetic disk 12 can be offset.

The load beam 211 functions as a spring generating a predetermined load that balances a hydrodynamic lifting force of the head slider 13. The load beam 211 includes a tab 215 disposed on a leading end portion thereof. The head slider as an example of a head, includes a slider and a head element portion fixed to a surface of the slider. The head element portion includes a write element and/or a read element. The write element converts an electric signal to a corresponding magnetic field according to the data stored in the magnetic disk 12. The read element, on the other hand, converts a magnetic field from the magnetic disk 12 to a corresponding electric signal.

The trace 122 is extended from a side of the gimbal 212 opposite to a spindle of the magnetic disk 12. The trace 122 extended from the gimbal 212 extends along the load beam 211 and a side surface (the side surface on a side opposite to the magnetic disk 12) of the arm 148 toward the pivot 15. The trace 122 includes a plurality of transmission wires, each being separated from each other by an insulation layer. Each of the transmission wires is connected to the head element portion of the head slider 13, so that a corresponding signal can be transmitted.

The trace 122 has a first end connected electrically to a preamp IC disposed near the pivot 15. Part of the trace 122 is fixed onto the gimbal 212 or formed directly thereon. An outside of the part of the trace 122 may be covered, as necessary, with epoxy resin on the gimbal 212. In accordance with the embodiment of the present invention, the trace 122 and the gimbal 212 are integrally formed. Like the wire structure on the gimbal 212, the trace 122 is formed from a stainless steel metal layer as a base material, a polyimide insulation layer stacked on the metal layer, a conductive layer on the polyimide insulation layer, and a polyimide protective layer.

Each layer of the trace 122 is formed continuously with a corresponding layer of the wire structure on the gimbal 212. Metal plating or the like may be applied, instead of the polyimide or other resin layer, to the protective layer formed for protection of a surface of the conductive layer. Further, the trace 122 may have a different number of transmission wires according to the type of the head slider 13.

Referring back to FIG. 1, the actuator 14 pivotally moves in the direction of being closer to or away from the magnetic disk 12 so that the head slider 13 can access the magnetic disk 12. A VCM 16 pivotally moves the actuator 14 about the pivot 15 according to a drive signal passed through a flat coil 17. The actuator 14 moves the head slider 13 radially along a surface of the magnetic disk 12. This allows the head slider 13 (the head element portion) to access any desired track. A control circuit on a control circuit board (not shown) mounted on a back surface of the base 11 performs operation control and signal processing for the HDD 1. Signals are transmitted via the trace 122, an FPC 143, and an FPC connector 147 between the head element portion and the control circuit.

The head slider 13 flies at a predetermined gap above the magnetic disk 12 by the following action. Specifically, pressure generated by viscosity of air between an ABS (air bearing surface) of the slider opposing the magnetic disk 12 and the spinning magnetic disk 12 balances pressure applied in the direction of the magnetic disk 12 by the actuator 14. When, for example, the magnetic disk 12 stops spinning, the actuator 14 lets the head slider 13 retract from above the magnetic disk 12 to a ramp 18. When the head slider 13 is retracted from above the magnetic disk 12, the tab 215 at the leading end of the HGA 120 is brought to rest on the ramp 18. Also known is a CSS (contact start and stop) system that retracts the head element portion to a zone disposed on an inner periphery of the magnetic disk 12 when the head element portion does not write or read data. The CSS system may be applicable to the HDD 1 according to embodiments of the present invention.

Referring to FIG. 1, the HDD 1 according to an embodiment of the present invention, includes the trace 122 extending along the side surface of the actuator 14, part of which is inserted in an accommodation member 31. The accommodation member 31 is fixed to the side surface that faces in the direction of pivotal motion of the arm 148, the side surface being opposite to the magnetic disk 12. In accordance with this embodiment, the accommodation member 31 is fixed to the side surface of the actuator 14 with an adhesive. The accommodation member 31 includes a slit-like recess. Part of the trace 122 is passed through the recess formed in the accommodation member 31. This helps suppress a fluttering phenomenon of the trace 122 caused by an air flow generated from spinning of the magnetic disk 12.

The accommodation member 31 is formed from Ultem or other resin. Use of a resin material for forming the accommodation member 31 allows the accommodation member 31 to be easily formed to have a complicated shape. Further, use of the resin material for forming the accommodation member 31 helps suppress dust and dirt generated from contact between the metal layer of the trace 122 and the accommodation member 31.

Figure 3:
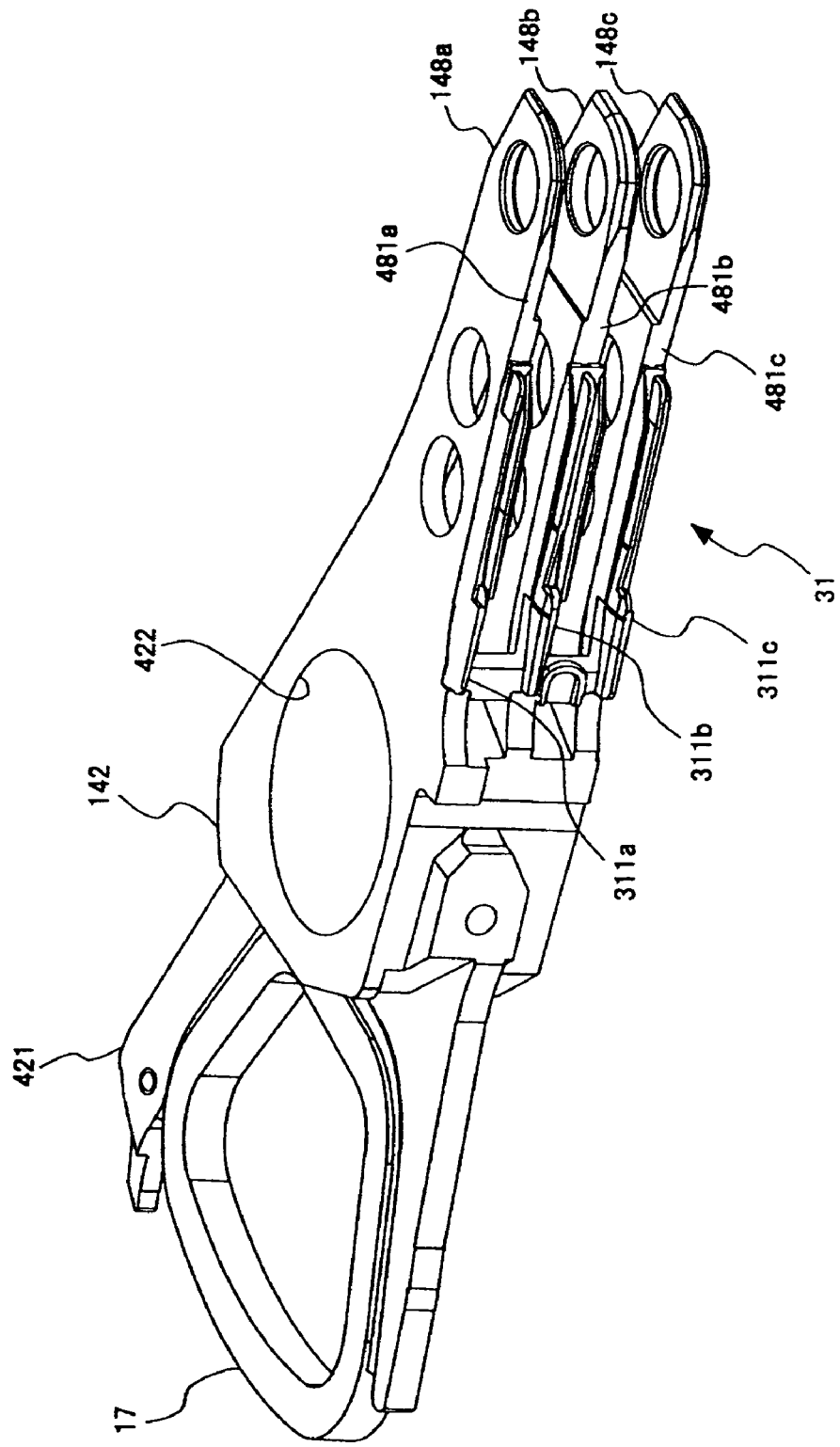
FIG. 3 is a perspective view showing schematically a condition, in which an accommodation member is fixed to a carriage according to an embodiment of the present invention.

FIG. 3 is a perspective view showing schematically the accommodation member 31 fixed to the side surface of the actuator 14. Shown in FIG. 3 are a carriage (E core) 142, the accommodation member 31, and a VCM coil 17. The carriage 142 is included in the actuator 14. The accommodation member 31 is fixed to a side surface of the carriage 142. The VCM coil 17 is fixed in a coil arm 421 of the carriage 142. Typically, the carriage 142 is formed from stainless steel or aluminum.

The carriage 142 includes a pivot bearing hole 422 formed at a center thereof. The pivot 15 fits into this pivot bearing hole 422. The carriage 142 according to an embodiment of the present invention, includes three arms 148a to 148c that are formed integrally with the coil arm 421. Specifically, a top arm 148a on the side of the top cover and a bottom arm 148c on the side of a bottom surface of the base 11, sandwich a middle arm 148b. The HGA 120 is connected to each of the arms 148a to 148c on the side opposite to the pivot bearing hole 422. Swaging may, for example, be used to connect each of the arms 148a to 148c to the HGA 120. It is to be noted that a type of actuator, in which each of the arms is formed as a separate member and is stacked one on top of another in the pivot, may also be applicable to the present invention.

Figure 4:
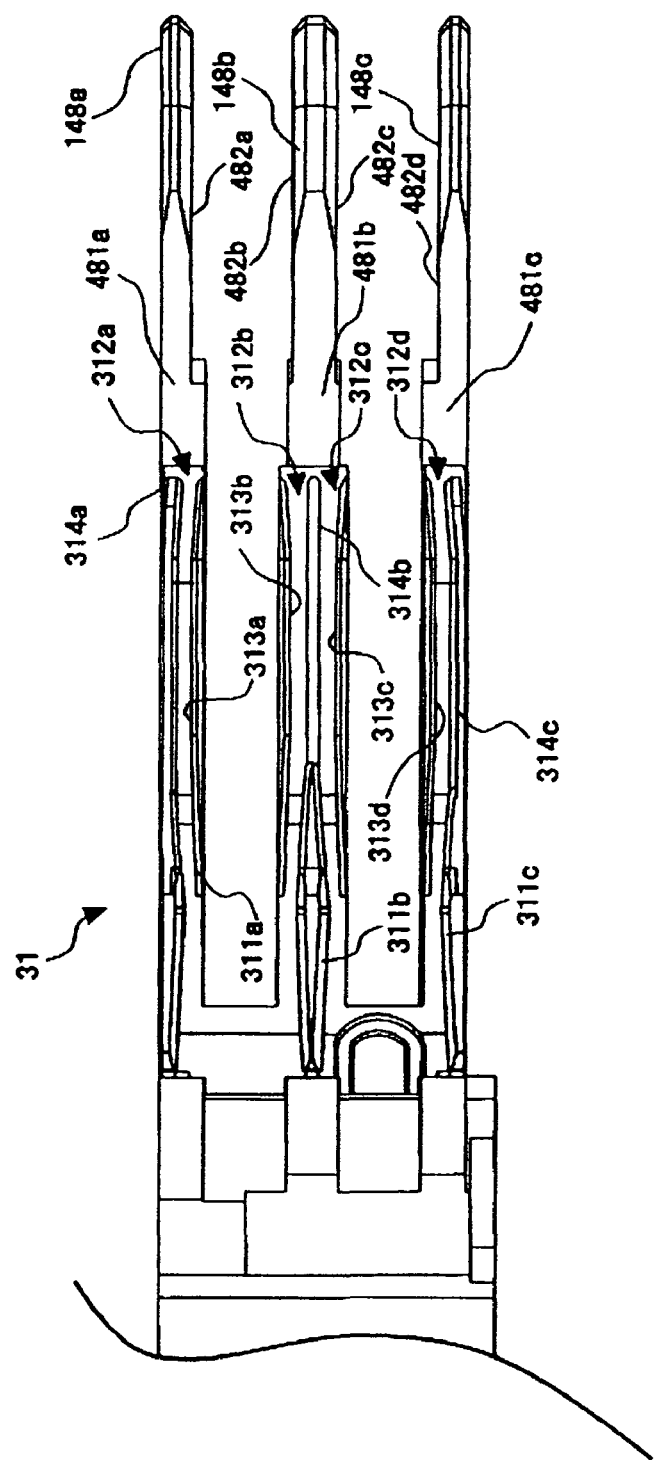
FIG. 4 is a side elevational view showing schematically the condition, in which the accommodation member is fixed to the carriage according to an embodiment of the present invention.

Accommodation portions 311a to 311c are secured to respective side surfaces 481a to 481c of the arms 148a to 148c. Each of the accommodation portions 311a to 311c forms part of the accommodation member 31. The trace 122 is passed through (not shown) a slit-like recess formed in each of the accommodation portions 311a to 311c. FIG. 4 is a side elevational view showing schematically the accommodation member 31 fixed to the side surface of the carriage 142. FIG. 4 is a view as viewed from the side opposite to the magnetic disk 12 in the pivotal motion direction and the side of the slit openings in the accommodation member 31.

The carriage 142 according to embodiments of the present invention, is adaptable to the HDD 1 having two magnetic disks 12. The magnetic disk 12 exists (not shown) between the arm 148a and the arm 148b, and between the arm 148b and the arm 148c. The HGA 120 is fixed to each of surfaces 482a to 482d of the arms 148a to 148c opposing a recording surface of the magnetic disk 12. Accordingly, the arms 148a and 148c support one HGA 120, while the arm 148b supports two HGAs 120. Each HGA 120 is fixed to a corresponding one of surfaces 482a to 482d such that the head slider 13 faces the recording surface of the magnetic disk 12.

The accommodation portion 311a includes a slit-like recess 312a. The accommodation portion 311b includes slit-like recesses 312b and 312c. The accommodation portion 311c includes a slit-like recess 312d. The trace 122 of each HGA 120 is extended through each of the recesses 312a to 312d from the head slider 13 toward the pivot bearing hole 422.

The recess 312a is defined by and between a wall 313a on the side of the magnetic disk 12 and a wall 314a opposite thereto. The recess 312b is defined by and between a wall 313b on the side of the magnetic disk 12 and a wall 314b opposite thereto. The recess 312c is defined by and between a wall 313c on the side of the magnetic disk 12 and the wall 314b opposite thereto. The recess 312d is defined by and between a wall 313d on the side of the magnetic disk 12 and a wall 314c opposite thereto.

Each of the walls 313a to 313d and 314a to 314c protrudes in the pivotal motion direction from the arm side surfaces 481a to 481c and extends therealong. In each of the recesses 312a to 312d, the trace 122 abuts on the corresponding wall of the walls 313a to 313d on the side of the magnetic disk 12. Preferably, each of the walls 313a to 313d should press part of the trace 122 and thus apply tension thereto. This even more effectively suppresses vibration of the trace 122.

Figure 5:
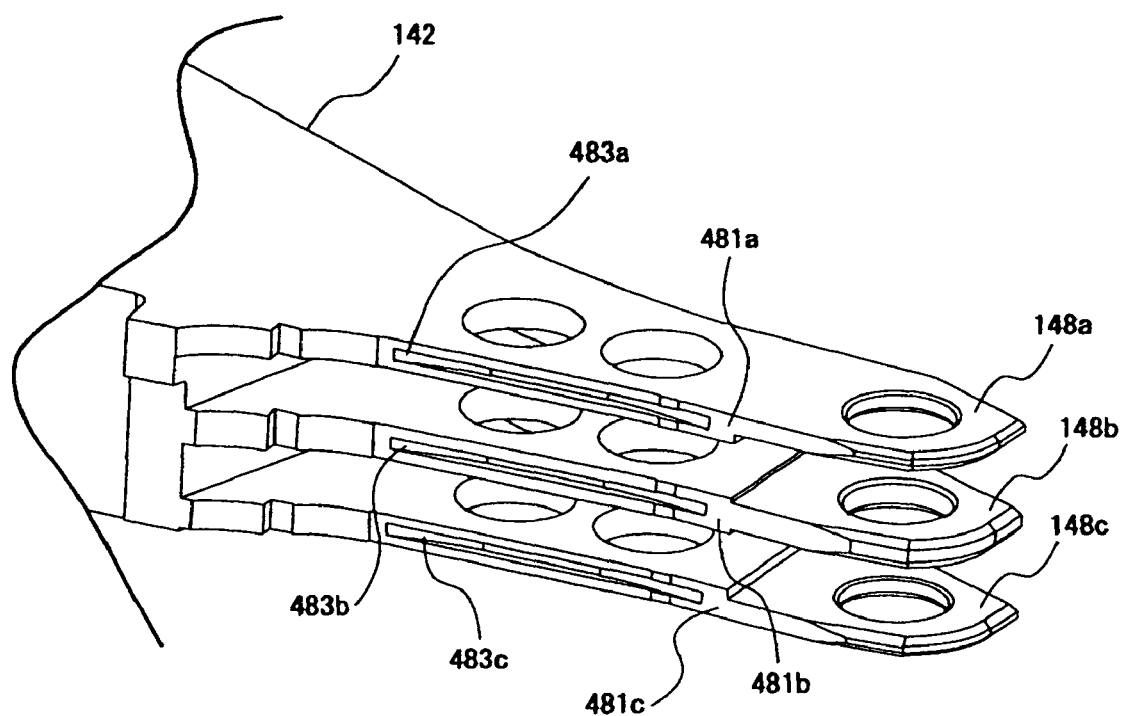
FIG. 5 is a perspective view showing schematically side surfaces of the carriage, to which the accommodation member is fixed according to an embodiment of the present invention.
Figure 6:
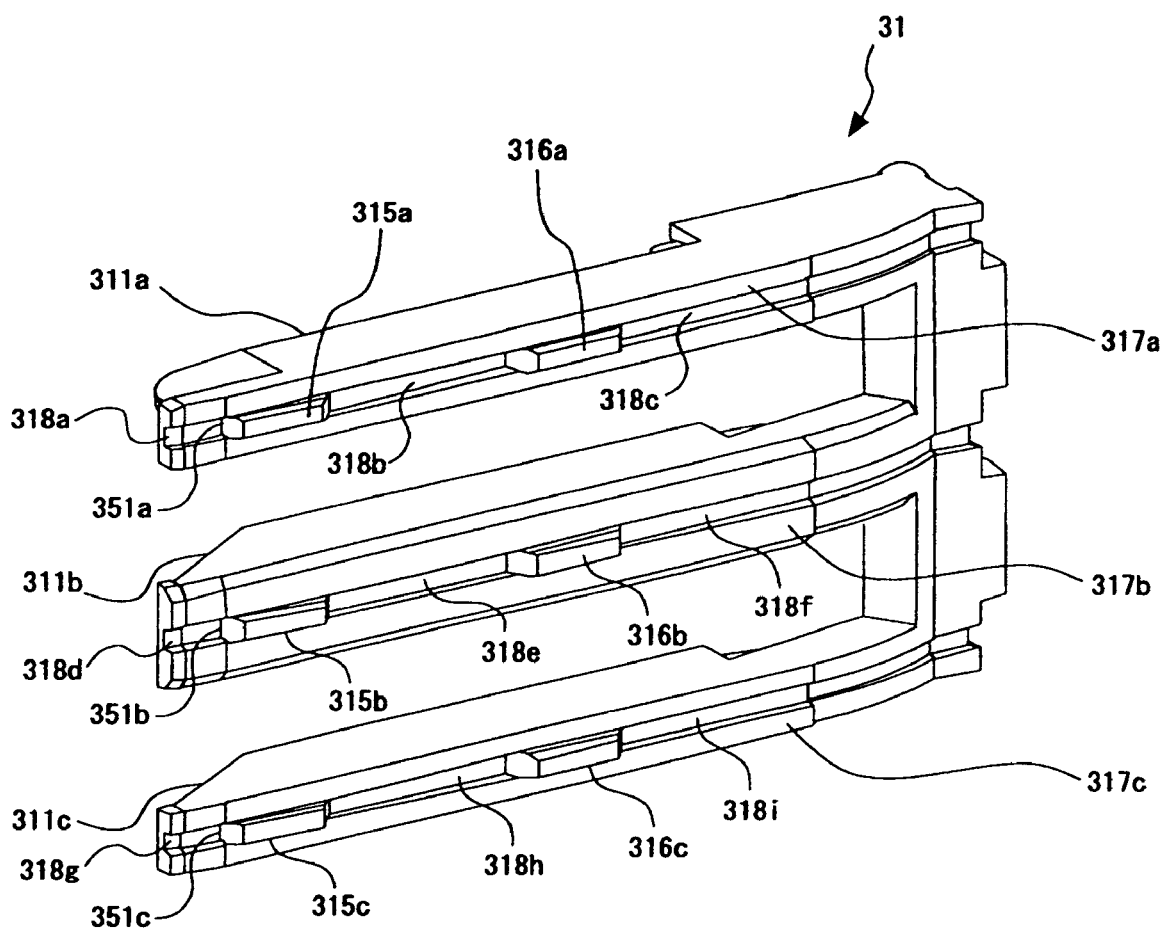
FIG. 6 is a perspective view showing shapes of surfaces of the accommodation member to be fixed to the actuator according to an embodiment of the present invention.

FIG. 5 is a perspective view showing schematically the side surfaces 481a to 481c of the carriage 142, to which the accommodation member 31 is fixed. As described earlier, the accommodation member 31 is fixed to the side surfaces 481a to 481c that face the pivotal motion direction of the carriage 142 and on the side opposite to the magnetic disk 12. Each of the side surfaces 481a to 481c includes a corresponding one of slit-like recesses 483a to 483c formed therein. The accommodation member 31, on the other hand, includes protrusions 315a to 315c and 316a to 316c that fit into corresponding ones of these recesses 483a to 483c as shown in FIG. 6. FIG. 6 is a perspective view showing the accommodation member 31 as viewed from the side of the carriage 142.

In processes for manufacturing the HDD 1, the accommodation member 31 is fixed to the side surfaces 481a to 481c using an adhesive. Typically, a thermosetting resin is used to fix the accommodation member 31 to the side surfaces 481a to 481c. The adhesive is applied to opposing surfaces 317a to 317c of the accommodation member 31 opposing the carriage 142. With the opposing surfaces 317a to 317c in abutment with the side surfaces 481a to 481c, a jig is used to hold the accommodation member 31 on the carriage 142. Being formed from resin, the accommodation member 31 can easily be deformed. The accommodation member 31 is particularly easy to warp in the direction of the pivot 15 (vertical direction in FIG. 6). This makes it necessary, in fixing the accommodation member 31 to the carriage 142, to hold the accommodation member 31 on the carriage 142 with deformation of the accommodation member 31 corrected as appropriately.

The carriage 142 and the accommodation member 31 in accordance with the embodiments of the present invention, have surfaces which oppose and are fixed to each other, formed with a corrugated surface structure. The corrugated surface structure is used to position correctly the accommodation member 31 in the pivot direction (Z direction) of the accommodation portions 311a to 311c. Specifically, the protrusions 315a to 315c of the accommodation member 31 fit into the recesses 483a to 483c of the carriage 142. This controls deformation of the accommodation portions 311a to 311c and thereby positions the accommodation portions 311a to 311c in the pivot direction.

Use of the corrugated surface structure formed on the surfaces on which the accommodation member 31 is fixed to the carriage 142 for positioning as described above contributes to make the accommodation member 31 thinner. It is to be noted that, in designing the HDD 1, there is a small gap, in particular, between the arm 148a and the top cover or between the arm 148c and the bottom surface of the base 11.

Accordingly, the gap between the top cover and the accommodation portion 311a may be greater than the gap between an inner surface of the top cover, which serves as a ceiling surface on the inside of the enclosure, and the side surface 481a. Alternatively, the gap between the bottom surface of the base 11 and the accommodation portion 311c may be greater than the gap between the bottom surface of the base 11 and the side surface 481c. This allows the thickness of the arm to be designed without regard to the accommodation member. It is to be noted that the smallest gap between the accommodation portion and the enclosure is preferably equal to, or more than, the greatest gap between the arm side surface and the enclosure.

In the example shown in FIG. 4, the accommodation portion 311a fixed to the top arm 148a, may have a thickness smaller than that of the side surface 481a. Further, accommodation portion 311c fixed to the bottom arm 148c, may have a thickness smaller than that of the side surface 481b. These arrangements allow the gap between the magnetic disk 12 and the arm to be made small, in addition to the gap between the enclosure and the arm. Referring to FIG. 4, it is to be noted that the accommodation portion 311b has a thickness greater than that of the side surface 481b of the middle arm 148b. The gap between the arm and the magnetic disk can, however, be made small by having the accommodation portion 311b thinner than the side surface 481b. According to the embodiment of the present invention, each of the accommodation portions and arm side surfaces has a constant thickness. If the thickness varies, the greatest thickness of the accommodation portion is equal to, or smaller than, the smallest thickness of the arm side surface.

Referring to FIG. 5, the carriage 142 according to embodiments of the present invention, includes slit-like recesses 483a to 483c formed in the corresponding side surfaces 481a to 481c thereof. Each of the recesses 483a to 483c includes inner walls on both sides in the pivot direction. Specifically, each of the recesses 483a to 483c has inner walls facing the pivot direction on the side of the top cover and that of the base bottom surface. If the accommodation portions 311a to 311c are deformed along the pivot direction, the protrusions 315a to 316c of the opposing surfaces 317a to 317c on the side of the carriage 142 of the accommodation portions 311a to 311c, abut on one of each pair of the inner walls. This controls deformation of the accommodation portions 311a to 311c, and achieves positioning in the pivot direction.

Referring to FIG. 6, the accommodation portions 311a to 311c according to embodiments of the present invention, include the plurality of protrusions 315a, 316a to 315c, and 316c. Each of the protrusions 315a to 316c is formed into an island-like shape. Accordingly, each of the protrusions 315a to 316c has steps on both sides thereof in the pivot direction and additional steps on both sides thereof in a direction perpendicular to the pivot direction.

The protrusions 315a to 315c disposed on a leading end side of the accommodation portions 311a to 311c, i.e., on the side of the head slider 13, are formed away from the protrusions 316a to 316c on the side of the pivot 15. Both the protrusions 315a to 315c and the protrusions 316a to 316c fit into the same recesses 483a to 483c. Accordingly, referring to FIGS. 7(a) and 7(b), the recesses 483a to 483c exist between the respective protrusions 315a to 316c and the respective protrusions 316a to 315c.

FIGS. 7(a) and 7(b) are views showing an exemplary condition, in which the protrusions 315a and 316a fit into the recess 483a. FIG. 7(a) is a cross-sectional view showing the condition as viewed from an opening side of the recess 483a. FIG. 7(b) is a cross-sectional view showing the condition as viewed from the top cover side. The head slider 13 exists on the right-hand side in FIGS. 7(a) and 7(b). Other accommodation portions 311b and 311c have the same configuration.

Referring to FIGS. 7(a) and 7(b), it is preferable that the recess 483a, in which the protrusions 315a and 316a fit, extend beyond both ends of the protrusions 315a and 316a, and spaces formed by the recess 483a exist on both sides of the protrusions 315a and 316a. These spaces function as adhesive pits for properly preventing an excess adhesive more than a predetermined amount from flowing out onto the arm. Referring to FIG. 7(c), protrusions 315a and 316a may be fit, respectively, into recesses 484a and 484b that are separated from each other.

In the case shown in FIG. 7(c), too, the recesses 484a and 484b exceed beyond both ends of the protrusions 315a and 316a in a direction from the pivot 15 toward the head slider 13. As a result, spaces are formed on both sides of the protrusions 315a and 316a and the spaces can be used for accumulating the adhesive therein. In accordance with embodiments of the present invention, however, fitting the two protrusions 315a and 316a in the single recess 483a makes greater the space between the protrusions 315a and 316a. An arrangement may also be employed, in which the space as the adhesive pit is formed only on one side of the protrusions 315a and 316a.

As described earlier, the leading end side (on the side of the head slider 13) of the accommodation portions 311a to 311c in the accommodation member 31 tends to warp. Accordingly, it is preferable that the protrusions for positioning of the accommodation portions 311a to 311c in the pivot direction be disposed on the leading end side of the accommodation portions 311a to 311c. More specifically, ends 351a to 351c of the protrusions 315a to 315c on the side of the head slider 13 should preferably be disposed on the side of the head slider 13 relative to a center of the accommodation member 31. Even more preferably, the ends 351a to 351c of the protrusions 315a to 315c on the side of the head slider 13 should be disposed on the side of the head slider 13 relative to a center between the center of the accommodation member 31 and the end on the side of the head slider 13.

Referring to FIG. 6, the accommodation member 31 according to embodiments of the present invention, includes slit-like recesses 318a to 318i formed in the accommodation portions 311a to 311c. Like the recesses 483a to 483c in the carriage 142, these recesses 318a to 318i function as adhesive pits. Preferably, the recesses should be formed on both sides of each of the protrusions 315a and 315c in the direction from the pivot 15 toward the head slider 13. With the accommodation member 31 fixed in position, the recesses 318a to 318i oppose the recesses 483a to 483c in the carriage 142.

Figure 8A:
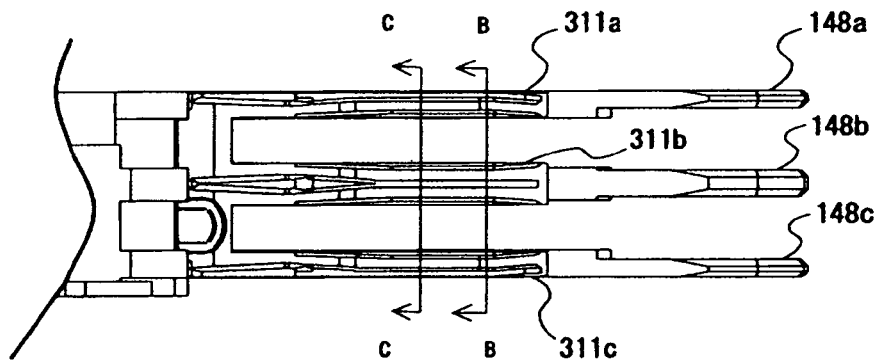
FIGS. 8(a) to 8(c) are views showing schematically a cross-sectional shape of the accommodation member fixed to the carriage according to an embodiment of the present invention.
Figure 8B:
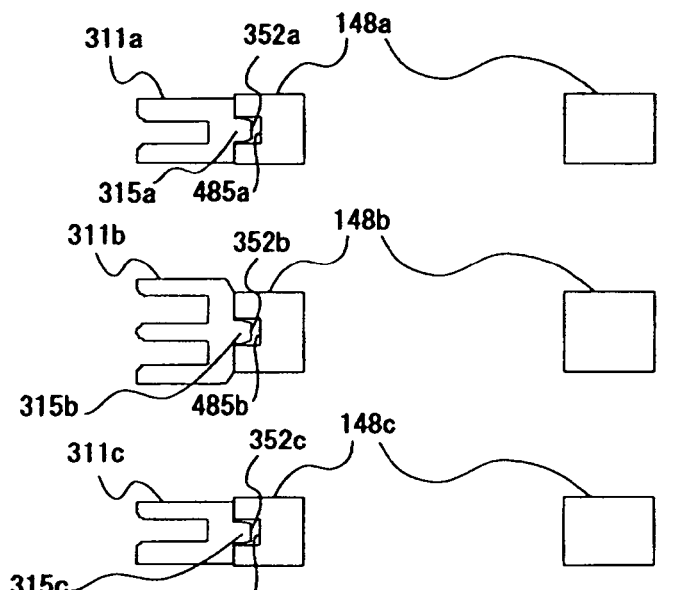
Figure 8C:
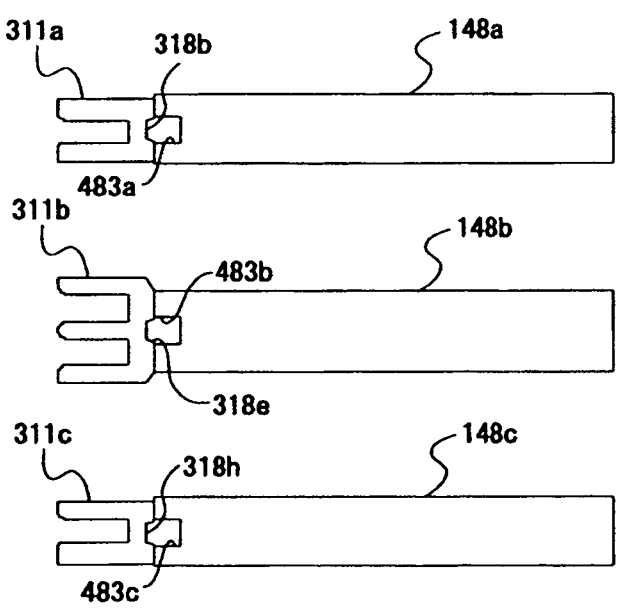

FIGS. 8(b) and 8(c) are cross-sectional views taken along line B-B and line C-C, respectively, of FIG. 8(a). Referring to FIG. 8(b), a gap exists between each of protruding ends 352a to 352c of the protrusions 315a to 315c of the accommodation member 31 and each of recess bottom surfaces 485a to 485c. The gap forms a space in which the adhesive is accumulated, which suppresses the amount of adhesive being squeezed out. A similar gap is formed between each of the protrusions 316a to 316c and corresponding recess bottom surfaces.

Leading end corners of the protrusions 315a to 315c are tapered such that the dimension in the pivot direction decreases toward the leading end. These tapers help make it easier to insert the protrusions 315a to 315c into the recesses 483a to 483c in the manufacturing processes. The similar tapers are also formed on the protrusions 316a to 316c. It is preferable that the tapers be formed on both upper and lower corners at the leading ends of the protrusions 315a to 315c. Referring to FIG. 8(c), the recesses 318b, 318e, and 318h formed in the accommodation portions 311a to 311c, respectively, oppose the recesses 483a to 483c, respectively, in the arms 148a to 148c. The same holds true with other recesses 318 of the accommodation member 31. This results in spaces for accumulating the adhesive being formed and achieves a required bonding area.

Although the present invention has been described in one particular embodiment, it should be understood that the present invention may be embodied by those skilled in the art in many other specific forms without departing from the spirit or scope of the invention. For instance, the present invention may be applied to disk drive apparatuses using other types of disks, in addition to the HDD.

The actuator according to embodiments of the present invention described heretofore, includes a plurality of arms and a plurality of HGAs. Embodiments in accordance with the present invention can still be applied to an actuator having a single arm or a single HGA. As described above, the recess in the arm may have inner walls on both the upper and lower sides. However, the recess may be adapted to have only one inner wall as long as warp of the accommodation portion can be corrected. It is also preferable from the standpoint of machining that the metal arm be formed with the recesses and the resin accommodation member be formed with boss-like protrusions. The corrugated surface structure may nonetheless be reversed.

As described above in accordance with one embodiment, the accommodation member may include a plurality of protrusions. It is nonetheless appropriate that in other embodiments the accommodation member may include only one protrusion. The protrusion may further be formed to extend all the way across the length of the accommodation member 31. If design permits, the corrugated surface structure may be one step formed on each of the accommodation member and the arm side surface, the steps being mutually fitted in the mating part to achieve positioning of the accommodation member in the pivot direction. The accommodation member is preferably fixed on the side opposite to the magnetic disk from the standpoint of routing of the trace. The accommodation member may nonetheless be fixed to the arm side surface on the side of the magnetic disk.

What is claimed is:

1. A disk drive apparatus comprising:
an enclosure;
a head that accesses a disk;
an actuator that is mounted inside the enclosure comprising a plurality of arms that supports a plurality of heads and pivotally moves about a pivot;
a resin member that is fixed to a side surface of each of said plurality of arms of the actuator, the side surfaces each facing a pivotal motion direction, having a recess facing said pivotal motion direction, through which a wire structural portion transmitting signals from the head is passed, formed on a side opposite to the side surface, and having a corrugated surface structure for positioning correctly the resin member in a pivot direction by being fitted into a corrugated surface structure formed on the side surfaces, such that said wire structure portion faces said pivotal motion direction;
wherein the resin member includes a plurality of protrusions protruding toward each of the corresponding recesses of the side surfaces; and
wherein the recess in each of the side surfaces of each of the plurality of arms of the actuator, in which the protrusion of the resin member fits, extends beyond both ends of the protrusion of the resin member in a direction from the pivot toward the head.

2. The disk drive apparatus according to claim 1,
wherein the plurality of protrusions of each of said plurality of arms are disposed away from each other in a direction from the pivot toward the head; and
wherein the plurality of protrusions fits into one recess formed on the side surfaces of each of said plurality of arms of the actuator.

3. A head assembly comprising:
a head that accesses a disk;
a suspension portion that supports the head;
an arm portion that has a pivot bearing hole formed therein and supports the suspension portion on a side opposite to the head;
a wire structural portion that is connected to the head and transmits signals from the head;
a resin member that is fixed to a side surface of said arm portion, the side surface facing a pivotal motion direction, having a recess facing said pivotal motion direction, through which said wire structural portion is passed, formed on a side opposite to the side surface, and having a corrugated surface structure for positioning correctly the resin member in a pivot direction by being fitted into a corrugated surface structure formed on the side surface, such that said wire structure portion faces said pivotal motion direction;
wherein the resin member includes a plurality of protrusions protruding toward each of the corresponding recesses of the side surfaces; and
wherein the recess in each of the side surfaces of said arm portion, in which the protrusion of the resin member fits, extends beyond both ends of the protrusion of the resin member in a direction from the pivot toward the head.

* * * * *